United States Patent [19]

Wotton

[11] Patent Number: 5,776,558
[45] Date of Patent: Jul. 7, 1998

[54] WEATHERPROOF TREE ORNAMENTATION

[75] Inventor: Michael C. Wotton, Plantsville, Conn.

[73] Assignee: Sun Hill Industries, Inc., Stamford, Conn.

[21] Appl. No.: 583,135

[22] Filed: Dec. 28, 1995

[51] Int. Cl.$^6$ .................... A01M 29/00; F41H 3/00
[52] U.S. Cl. ................ 428/16; 40/660; 206/575; 428/18; 428/919
[58] Field of Search ................. 428/7, 16, 18, 428/919; 5/482; 206/575; 40/660, 665

[56]    References Cited

U.S. PATENT DOCUMENTS

| | | | |
|---|---|---|---|
| 3,052,054 | 9/1962 | Littleton et al. | 428/919 X |
| 3,442,275 | 5/1969 | Ternes | 428/919 X |
| 3,613,133 | 10/1971 | Isola et al. | 5/482 X |
| 4,226,902 | 10/1980 | Webb | 428/16 X |
| 4,365,436 | 12/1982 | Ritchey | 428/172 X |
| 4,473,087 | 9/1984 | Cavender | 428/919 X |
| 4,656,065 | 4/1987 | Yacovella | 428/919 X |
| 4,875,245 | 10/1989 | Isola | 5/482 |
| 4,890,571 | 1/1990 | Gaskill | 428/16 X |
| 4,939,004 | 7/1990 | Fuss | 428/16 X |
| 5,195,638 | 3/1993 | Zinbarg | 428/16 X |

OTHER PUBLICATIONS

Cartoon From p. 4 of the Thursday, Jul. 26, 1979 Fairfax Northern Virginia Sun.

*Primary Examiner*—Henry F. Epstein
*Attorney, Agent, or Firm*—David P. Gordon; Thomas A. Gallagher

[57]    ABSTRACT

A weatherproof seasonal tree ornamentation includes a sheet of clear waterproof plastic which is dimensioned to fit around the trunk of a tree and which is imprinted with at least some facial indicia such as two eyes and a mouth. When the ornamentation is attached to a tree, the clear portion of the ornamentation blends in with the color of the tree trunk and the facial indicia appear to be part of the tree. The resulting effect of the ornamentation is to give the appearance that the tree is an animate character having a face. According to a second embodiment, the sheet of clear waterproof plastic is imprinted with indicia of a complete animate character, i.e. face, torso and legs. When the ornamentation of this embodiment is attached to the trunk of a tree, the clear portion of the ornamentation blends in with the color of the tree trunk. The resulting effect is the appearance of an animate character standing in front of the tree. According to a third embodiment, one or more sheets of clear waterproof plastic are imprinted with multiple indicia which can be arranged to form a complete animate character. The sheet(s) include indicia representing different faces, different torsos and different pairs of legs. The different faces, torsos and pairs of legs can be mixed and matched with each other to create multiple different characters.

19 Claims, 6 Drawing Sheets

5,776,558

1

WEATHERPROOF TREE ORNAMENTATION

BACKGROUND OF THE INVENTION

1. Field of the Invention

The invention relates to outdoor decorations. More particularly, the invention relates to weatherproof ornamentation for use with an outdoor tree.

2. State of the Art

It is known in the art to decorate outdoor trees at Christmas time. These decorations usually include lights and colored ornaments which are hung from limbs of the tree in a traditional manner. Co-owned co-pending U.S. Ser. No. 08/261,848 entitled "Christmas Tree Ornament Assemblies" also discloses large sized printed plastics ornaments which are hung from tree limbs. During the Halloween season it is also known to use tree limbs to support decorations such as is disclosed in co-owned prior U.S. Pat. No. 5,285,898. In that patent, a bat-like decorative object may be hung from tree branches in order to simulate a flying bat.

Other than the aforementioned seasonal hanging tree decorations, it is not generally known to provide ornamentation on trees during holiday or other seasons. While it is known to tie a yellow ribbon around the trunk of a tree to honor and memorialize troops and war veterans, the ribbons are not particularly ornamental and are not seasonal.

SUMMARY OF THE INVENTION

It is therefore an object of the invention to provide a weatherproof ornamentation for use on an outdoor tree.

It is also an object of the invention to provide a weatherproof seasonal ornamentation for use on the trunk of an outdoor tree.

It is another object of the invention to provide a weatherproof seasonal ornamentation for use on an outdoor tree in which the tree cooperates with the ornamentation to create an illusion that the tree is an animate character.

It is a further object of the invention to provide a kit containing ornamentation suitable for a variety of different sized trees.

In accord with these objects which will be discussed in detail below, the weatherproof tree ornamentation according to a first embodiment of the present invention includes a sheet of clear waterproof plastic which is dimensioned to fit around the trunk of a tree and which is imprinted with at least some facial indicia such as two eyes and a mouth. When the ornamentation is attached to a tree, the clear portion of the ornamentation blends in with the color of the tree trunk and the facial indicia appear to be part of the tree. The resulting effect of the ornamentation is to give the appearance that the tree is an animate character having a face. The first embodiment of the invention is particularly well suited as a Halloween decoration.

According to a second embodiment of the invention, a sheet of clear waterproof plastic which is dimensioned to fit around the trunk of a tree is provided and is imprinted with indicia of a complete animate character, i.e. face, torso and legs. When the ornamentation of this embodiment is attached to the trunk of a tree, the clear portion of the ornamentation blends in with the color of the tree trunk. The resulting effect is the appearance of an animate character standing in front of the tree.

According to a third embodiment of the invention, one or more sheets of clear waterproof plastic are provided and are imprinted with multiple indicia which can be arranged to

2 form a complete animate character. The sheet(s) include indicia representing different faces, different torsos and different pairs of legs. The different faces, torsos and pairs of legs can be mixed and matched with each other to create multiple different characters.

A preferred aspect of the invention includes providing multiple indicia on a relatively large sheet of clear plastic and indicating with dotted lines where the large sheet should be cut to form several tree ornamentations. According to a presently preferred first embodiment of the invention, facial indicia of different sizes are imprinted on a single sheet of plastic with cut-out lines defining different sized cut sheets for use with different sized trees. These facial indicia include a plurality of pairs of eyes and assorted mouths, all of which are imprinted in black outline with white filling.

In each of the embodiments of the invention, the ornamentation is attached to the tree trunk using tape, tacks, staples, nails, or other fastening devices. A kit according to the invention may include the one or more sheets of clear waterproof plastic on which are imprinted facial and or character indicia in conjunction with a plurality of tacks and/or weatherproof tape, or other fastening device.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
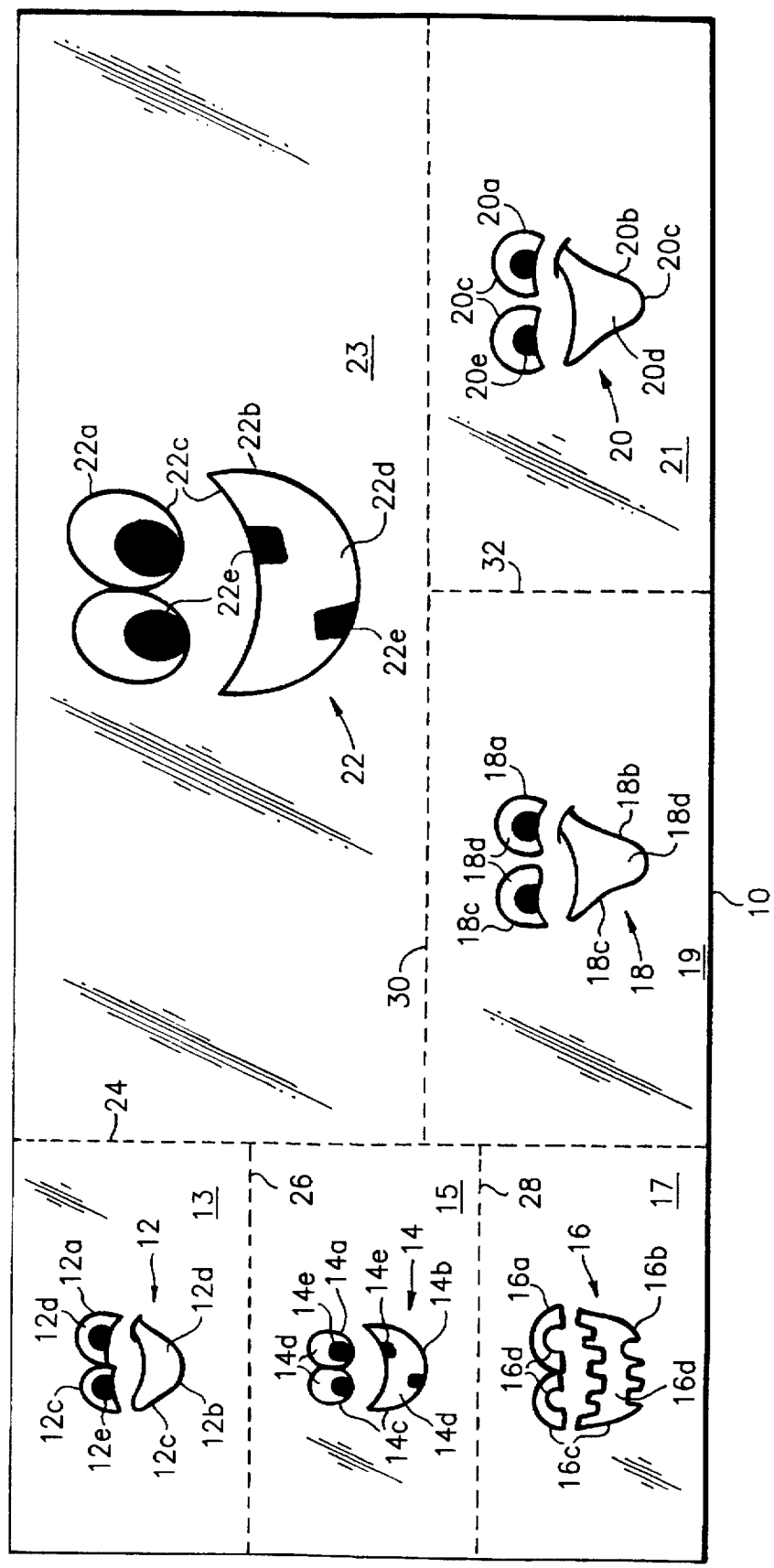
FIG. 1 is a plan view of a presently preferred first embodiment of the invention.

Referring now to FIG. 1, a presently preferred first embodiment of the ornamentation according to the invention includes a relatively large rectangular clear plastic sheet 10, preferably approximately thirty-three inches by one hundred twenty inches in dimension. The sheet 10 is imprinted with six sets of facial indicia 12, 14, 16, 18, 20, 22. Each of the facial indicia preferably includes a pair of eyes 12a, 14a, 16a, 18a, 20a, 22a and a mouth 12b, 14b, 16b, 18b, 20b, 22b. The eyes and the mouths are preferably imprinted in black outline 12c, 14c, 16c, 18c, 20c, 22c with white fill 12d, 14d, 16d, 18d, 20d, 22d, although other contrasting outline and fill colors can be utilized. Teeth and eye pupils or irises are imprinted as black fill 12e, 14e, 16e, 18e, 20e, 22e, although again, other colors could be utilized.

According to this presently preferred embodiment, the sheet 10 is partitioned into six areas 13, 15, 17, 19, 21, 23 by dotted lines 24, 26, 28, 30, 32 which are imprinted on the sheet 10, preferably in white. Alternatively, perforations may be provided in lieu of imprinted lines. As seen in FIG. 1, the facial indicia 12, 14, and 16 are each of a first relatively small size; the facial indicia 18 and 20 are of a second relatively medium size; and the indicia 22 are of a third relatively large size. In addition, the areas 13, 15, and 17 of the sheet which include the small size facial indicia 12, 14, and 16 are relatively small as compared to the areas 19 and 21 which include the medium size facial indicia 18 and 20; and the area 23 which includes the large facial indicia 22 is relatively large compared to all of the other areas. In this presently preferred embodiment using a plastic sheet 10 which is approximately thirty-three inches by one hundred twenty inches, the small areas 13, 15, 17 defined by the lines 24, 26, and 26 are each approximately eleven inches by thirty inches, the medium sized areas 19 and 21 are each approximately fourteen inches by forty-five inches, and the large sized area 23 is approximately nineteen inches by ninety inches. Therefore, when the sheet 10 is cut along the lines 24, 26, 28, 30, and 32, six weatherproof tree ornamentations will be presented, three relative small, two medium size, and one large. The dimensions given according to the presently preferred embodiment are chosen so that the ornamentations fit at least half way and preferably fully around the trunks of trees common in the northeast U.S. From the foregoing, those skilled in the art will appreciate that the facial indicia shown in FIG. 1 may be varied considerably and that the dimensions of the plastic sheet are chosen according to the economics of manufacture as well as the suitability to fit trees of various size. Therefore it will be understood that each of the six ornamentations shown in FIG. 1 could be manufactured on a separate sheet of plastic, but that it is more economical to provide multiple ornamentations on a single sheet having imprinted cut lines.

Figure 2:
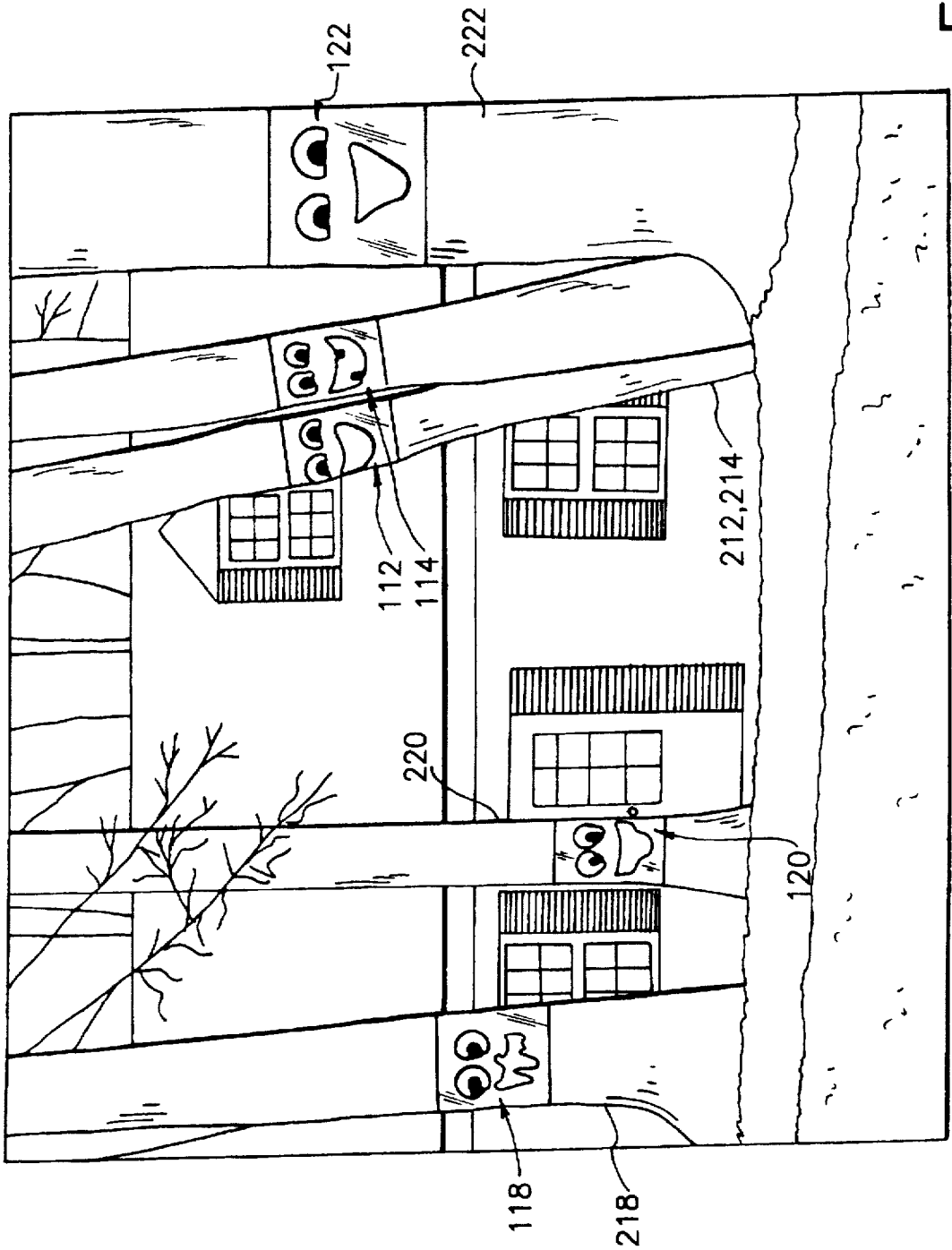
FIG. 2 is a perspective view of ornamentation according to the first embodiment of the invention attached to trees.

Turning now to FIG. 2, it will be appreciated that after the different size ornamentations are cut from the relatively large sheet, they are each attached to a tree having a trunk of suitable size. For example, relatively small ornamentations 112, 114 are attached to relatively narrow tree trunks 212, 214; medium sized ornamentations 118, 120 are attached to medium sized tree trunks 218, 220; and a large sized ornamentation 122 is attached to a relatively large tree trunk 222. The ornamentations may be attached to the tree trunks using tacks, tape, adhesives, nails, pins, clips, staples, etc., as shown for example in FIGS. 6a–6d. Particularly where tape, adhesive, pins, clips, or staples are used to secure the ornamentation to the tree, it is preferable that the plastic sheet extend completely around the tree trunk so that a plastic to plastic contact is made at the point of securement. As seen in FIG. 2, when the ornamentations are attached to trees, the clear plastic reveals the natural coloring of the tree trunk and the facial indicia appears to be a part of the tree giving the illusion that the tree is an animate character having a face.

Figure 3A:
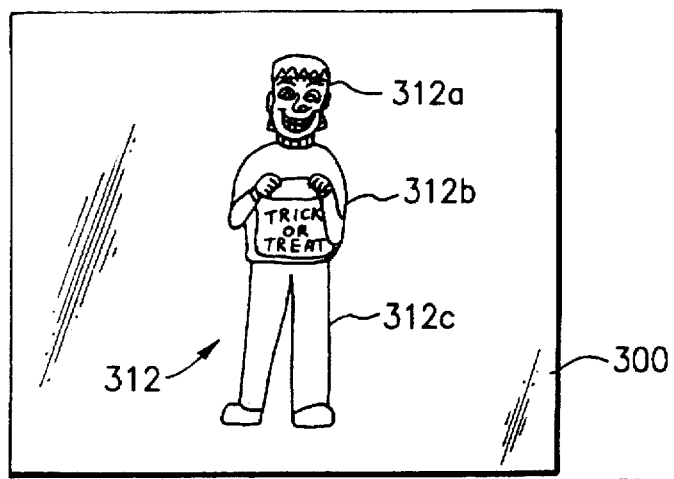
FIG. 3a is a plan view of a second embodiment of the invention illustrating a first character.
Figure 3B:
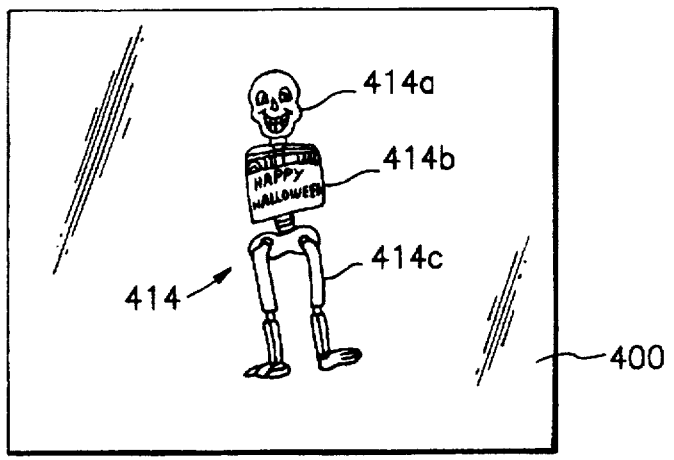
FIG. 3b is a plan view of a second embodiment of the invention illustrating a second character
Figure 3C:
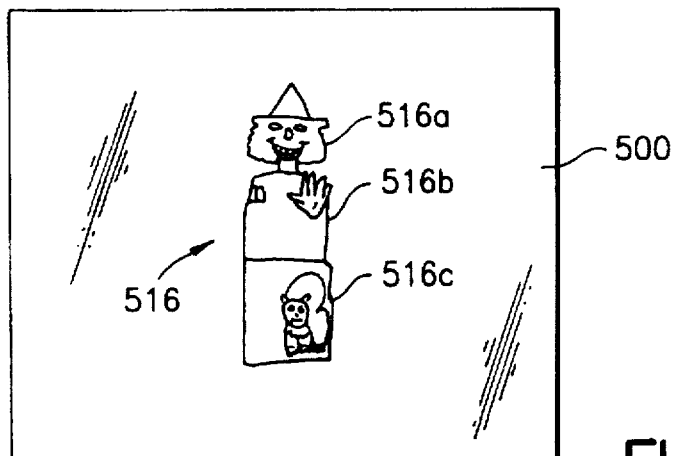
FIG. 3c is a plan view of a second embodiment of the invention illustrating a third character.
Figure 4:
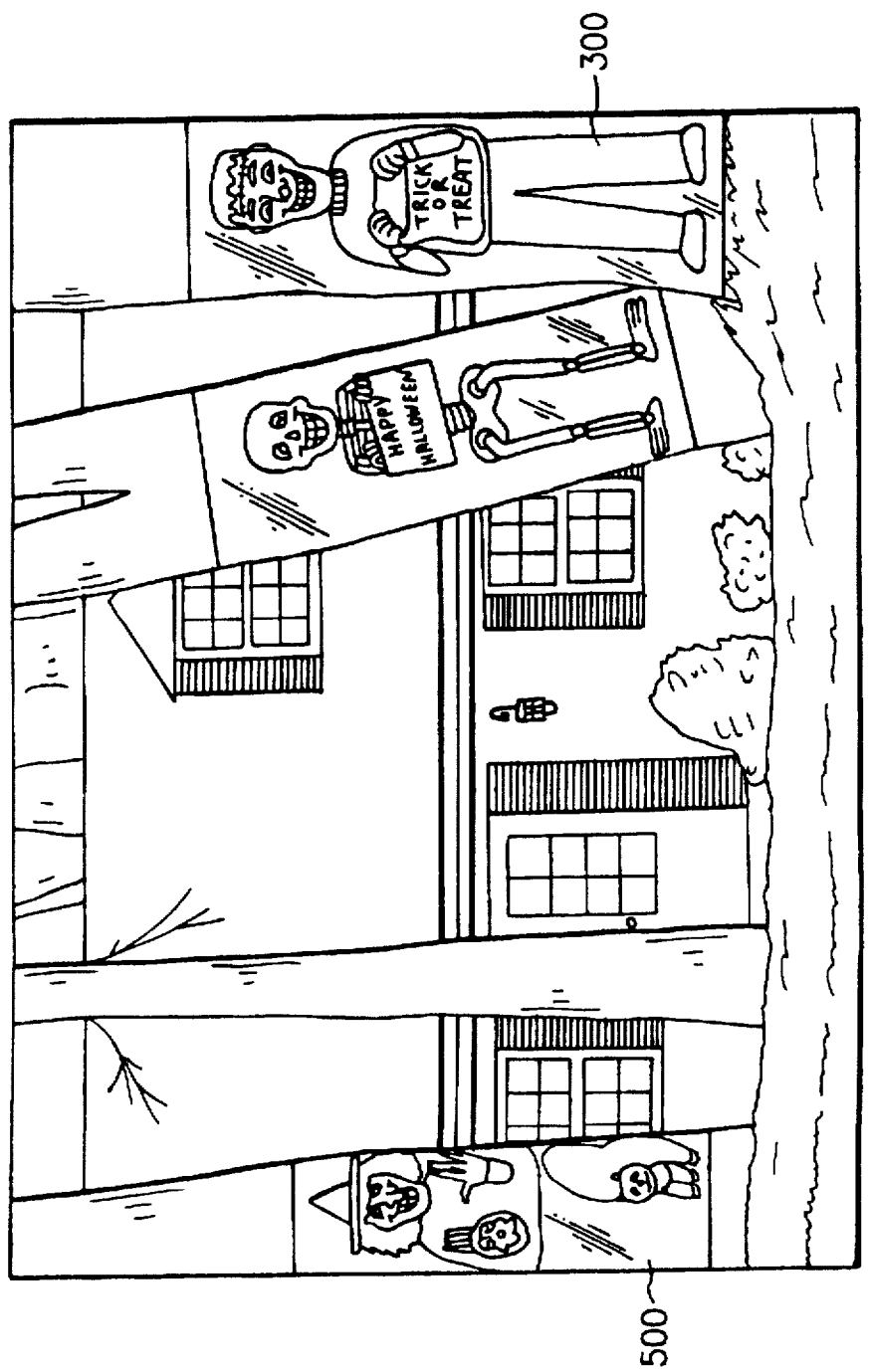
FIG. 4 is a perspective view of the second embodiments of the invention from FIGS. 3a–3c attached to trees.

A second embodiment of the invention is illustrated in FIGS. 3a–3c and FIG. 4. In FIGS. 3a–3c, clear rectangular plastic sheets 300, 400, 500 are each provided with character indicia 312, 414, 516 respectively. As shown, the characters are seasonal to Halloween, i.e., a Frankenstein 312, a skeleton 414, and a witch 516, although it will be appreciated that other seasonal characters such as elves, cupids, gnomes, Pilgrims could be utilized. The characters are imprinted on the respective sheets 300, 400, and 500 in color where appropriate, (e.g. the skeleton 414 may be imprinted in black and white only). Each of the character indicia includes a head 312a, 414a, 516a, a torso 312b, 414b, 516b, and a pair of legs 312c, 414c, 516c respectively, thereby forming a complete character. The sheets 300, 400, and 500 are dimensioned larger than the ornamentations described above because they contain the indicia of torso and legs in addition to the facial indicia. As shown in FIG. 4, each sheet 300, 400, 500 is attached to a tree trunk in the same manner as the ornamentations described above with reference to FIGS. 1 and 2. Those skilled in the art will appreciate that when the sheets are attached to trees as shown in FIG. 4, the clear portions of the sheets reveal the natural color of the tree trunks and the imprinted characters appear to be standing or floating in air in front of the tree.

Figure 5:
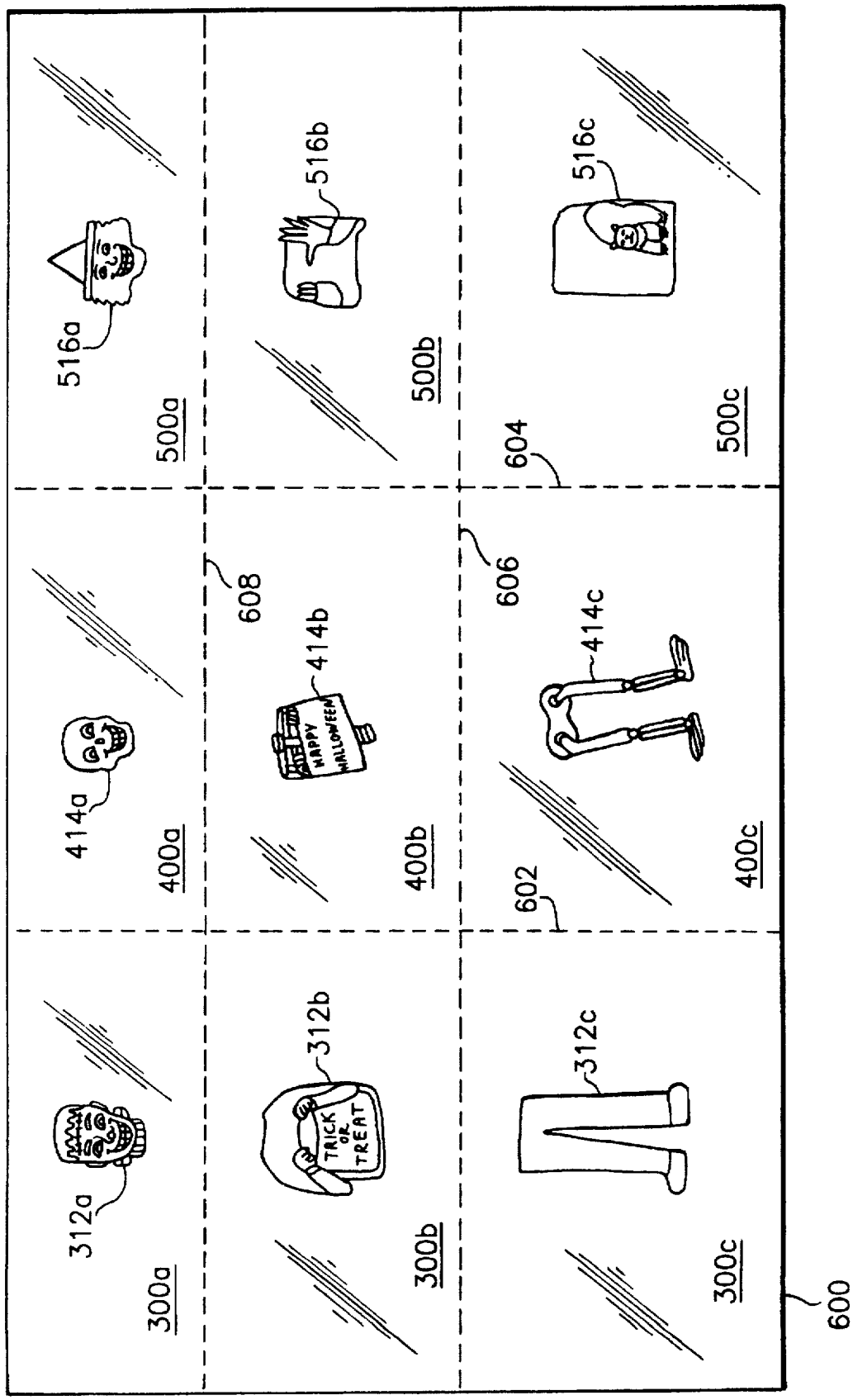
FIG. 5 is a plan view of a third embodiment of the invention.
Figure 6A:
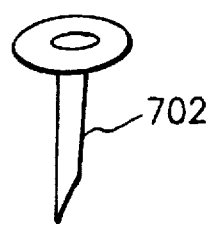
FIGS. 6a–6d show various attachment devices for attaching the ornamentation of the invention to a tree.
Figure 6B:
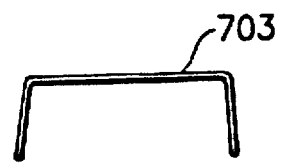
Figure 6C:
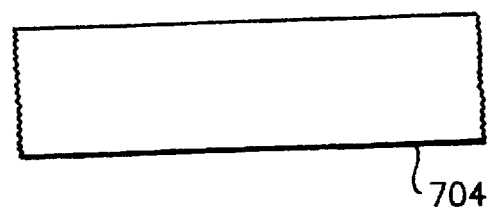
Figure 6D:
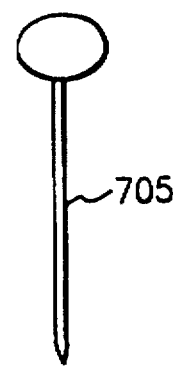

Referring now to FIG. 5, a third embodiment of the invention includes a relatively large rectangular plastic sheet 600 which is divided into nine areas 300a–300c, 400a–400c, and 500a–500c by imprinted dashed cut lines 602, 604, 606, and 608. Each of the nine areas is imprinted with one of head indicia, torso indicia, or legs indicia. Preferably, three of the areas 300a, 400a, 500a are imprinted with head indica 312a, 414a, 516a; three of the areas 300b, 400b, 500b are imprinted with torso indica 312b, 414b, 516b; and three of the areas 300c, 400c, 500c are imprinted with legs indica 312c, 414c, 516c. It is also preferable that the indicia be chosen such that for each head indica, a matching torso and legs indicia is provided so that three complete characters can be formed with appropriate head, torso and leg indicia. However, it is possible to provide torso and leg indicia which are not specifically matching with each other or with any of the head indicia. The object of this embodiment of the invention is to allow the creation of multiple different characters by mixing and matching head, torso and leg indicia. The areas are cut along the cut lines to form nine plastic sheets which are selectively attached to trees as described above. By selecting one sheet containing head indicia, one sheet containing torso indicia, and one sheet containing legs indicia, the three selected sheets can be attached to the trunk of a tree to form a custom character which appears to be standing or floating in front of the three as described above with reference to the second embodiment.

FIGS. 6a–6d show examples of a tack 702, a staple 703, an adhesive tape 704, and a nail 705 which may be used to affix the ornamentation of the invention to a tree as described herein. A kit according to the invention may include the ornamentation in conjunction with a plurality of such devices for affixing the ornamentation to a tree.

There have been described and illustrated herein several embodiments of a weatherproof seasonal tree ornamentation. While particular embodiments of the invention have been described, it is not intended that the invention be limited thereto, as it is intended that the invention be as broad in scope as the art will allow and that the specification be read likewise. Thus, while particular indicia have been disclosed, it will be appreciated that other indicia could be utilized. Also, while certain seasonal characters have been shown, it will be recognized that other types of seasonal and non-seasonal characters could be used with similar results obtained. Indeed, the indicia and characters can be chosen not only to create the appearance of the tree being an animate character, or the appearance of an animate character standing or floating in front of the tree, but of an animate character interacting with the tree. For example, the character could be shown with pruning shears as if the character were actually pruning the tree, or the character could be shown as if climbing the tree. It will also be appreciated that while particular configurations have been disclosed in reference to dimensions of the plastic sheets, other configurations could be used as well. Furthermore, while the preferred embodiments have been disclosed as having multiple indicia imprinted on a single sheet which is cut prior to attachment to a tree, it will be understood that different numbers of indicia, or a single indicium on a single uncut sheet can achieve the same or similar function as disclosed herein. In addition, while it is preferable, in order to achieve the most appealing ornamentation, that the sheets containing the indicia be made of clear plastic (apart from the indicia which are relatively opaque), it is possible to use plastic which is colored to simulate the color of a tree trunk so that the plastic absent of indicia blends in with the tree trunk to create the desired effect. In fact, it is also possible to make the indicia from highly reflective or "glow in the dark" pigmentation to achieve desired effects; particularly at night or dusk. It will therefore be appreciated by those skilled in the art that yet other modifications could be made to the provided invention without deviating from its spirit and scope as so claimed.

I claim:

1. A weatherproof tree ornamentation for use with an outdoor tree, said ornamentation comprising:

a weatherproof plastic sheet dimensioned to fit at least partially around the trunk of the tree, said sheet being imprinted with indicia suggesting an animate character such that when said sheet is attached to the trunk of the tree, said indicia create the appearance of the tree being an animate character.

2. An ornamentation according to claim 1, wherein:

said weatherproof plastic sheet is either substantially clear and reveals the natural color of the tree trunk or substantially bark-colored to blend in with the tree trunk, and said indicia are substantially opaque.

3. An ornamentation according to claim 2, wherein:

said indicia facial indicia are substantially opaque and include facial indicia and when said sheet is attached to the trunk of the tree said facial indicia create the appearance of the tree being an animate character having a face.

4. An ornamentation according to claim 3, wherein:

said facial indicia includes two eyes and a mouth.

5. An ornamentation according to claim 4, wherein:

said two eyes and said mouth are imprinted on said sheet with an outline of a first color and fill of a second color which contrasts with said first color.

6. A weatherproof tree ornamentation for use with an outdoor tree, said ornamentation comprising:

a weatherproof plastic sheet dimensioned to fit at least partially around the trunk of the tree, said sheet being imprinted with indicia suggesting an animate character such that when said sheet is attached to the trunk of the tree, said indicia create the appearance of one of the tree being an animate character, an animate character standing in front of the tree, an animate character floating in front of the tree, and an animate character interacting with the tree, wherein said weatherproof plastic sheet is either substantially clear and reveals the natural color of the tree trunk or substantially bark-colored to blend in with the tree trunk.

7. An ornamentation according to claim 6, wherein:

said indicia include facial indicia, torso indicia and legs indicia forming a complete character, and when said sheet is attached to the trunk of the tree said indicia create the appearance of said complete character standing or floating in front of the tree or interacting with the tree.

8. An ornamentation according to claim 7, wherein:

said indicia are imprinted in color.

9. An ornamentation according to claim 7, wherein:

said complete character is one of a Halloween skeleton, a witch, or a Frankenstein monster.

10. An ornamentation according to claim 1, wherein:

said indicia are suggestive of a seasonal holiday.

11. A weatherproof tree ornamentation kit for use with one or more outdoor trees, said kit comprising:

a weatherproof plastic sheet, said sheet being imprinted or perforated with cut lines defining a plurality of ornamentation areas, each of said areas being dimensioned to fit at least partially around the trunk of a tree, each of said areas being imprinted with indicia suggesting an animate character such that when said area is cut from said sheet and is attached to the trunk of the tree said indicia create the appearance of one of the tree being an animate character, an animate character standing in front of the tree, an animate character floating in front of the tree, and an animate character interacting with the tree.

12. A kit according to claim 11, wherein:

said weatherproof plastic sheet is substantially clear and reveals the natural color of the tree trunk, and said indicia are substantially opaque.

13. A kit according to claim 12, wherein:

said indicia include facial indicia having two eyes and a mouth and when said area is attached to the trunk of the tree said facial indicia create the appearance of the tree being an animate character having a face.

14. A kit according to claim 13, wherein:

said two eyes and said mouth are imprinted on said area with an outline of a first color and fill of a second color which contrasts with said first color.

15. A kit according to claim 11, wherein:

said areas and said indicia are of different sizes for use with different sized trees.

16. A kit according to claim 11, wherein:

said indicia include facial indicia, torso indicia and legs indicia for forming a complete character and when said areas are attached to the trunk of the tree said indicia create the appearance of said complete character standing or floating in front of the tree.

17. A kit according to claim 16, wherein:

said indicia include at least two facial indicia, at least two torso indicia, and at least two legs indicia for forming up to eight different possible characters by combining one facial indicium with one torso indicium with one legs indicium.

18. A kit according to claim 16, wherein:

said complete character is one of a Halloween skeleton, a witch, or a Frankenstein monster.

19. A kit according to claim 11, wherein:

said indicia are suggestive of a seasonal holiday.

* * * * *